United States Patent
Rahgozar et al.

(10) Patent No.: US 7,522,369 B1
(45) Date of Patent: Apr. 21, 2009

(54) CIRCUITS, ARCHITECTURES, APPARATUS, SYSTEMS, AND METHODS FOR MAINTAINING CONSTANT SPACING IN A READ/WRITE APPARATUS FOR DATA STORAGE

(75) Inventors: Parviz Rahgozar, Cupertino, CA (US); Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 386 days.

(21) Appl. No.: 11/355,459

(22) Filed: Feb. 15, 2006

Related U.S. Application Data

(60) Provisional application No. 60/699,968, filed on Jul. 15, 2005.

(51) Int. Cl.
G11B 21/02 (2006.01)
G11B 5/09 (2006.01)

(52) U.S. Cl. .......................................... 360/75; 360/51
(58) Field of Classification Search ........................ None
See application file for complete search history.

(56) References Cited

U.S. PATENT DOCUMENTS

| | | | |
|---|---|---|---|
| 5,869,988 A | 2/1999 | Jusuf et al. | |
| 5,991,113 A | 11/1999 | Meyer et al. | |
| 6,775,338 B1 | 8/2004 | Sutardja | |
| 6,798,597 B1 | 9/2004 | Aram et al. | |
| 6,963,464 B2 | 11/2005 | Xu et al. | |
| 6,972,919 B2 | 12/2005 | Suk | |
| 6,975,472 B2 * | 12/2005 | Stover et al. | 360/59 |
| 7,256,957 B1 * | 8/2007 | Rahgozar | 360/75 |
| 2004/0184177 A1 * | 9/2004 | Doi et al. | 360/68 |
| 2005/0105204 A1 | 5/2005 | Bloodworth et al. | |
| 2005/0129090 A1 | 6/2005 | Sheperek et al. | |
| 2006/0114587 A1 * | 6/2006 | Kalahasthi et al. | 360/46 |
| 2007/0268613 A1 * | 11/2007 | Fitzpatrick et al. | 360/75 |

\* cited by examiner

*Primary Examiner*—Andrew L Sniezek

(57) ABSTRACT

Circuits, architectures, a system and methods for adjusting spacing between a data writing mechanism and a data storage medium. The circuit generally includes (a) adjustment logic configured to (i) determine a first length of time of a write operation to a data storage medium, and (ii) determine a second length of time between the first write operation and a second write operation, (b) a controller configured to adjust a state variable of a write signal to a mechanism that writes data to the storage medium in accordance with the first and second lengths of time, and (c) an output circuit providing the write signal to the write mechanism. The method generally includes the steps of (1) determining a first length of time for a first write operation; and (2) determining a second length of time between the first write operation and a second write operation; and (3) adjusting at least one state variable of a write signal provided to the data writing mechanism in accordance with the determining steps. The present invention advantageously reduces adverse spacing modulation between the writing mechanism and the storage medium, thereby enabling improved data integrity, reduced bit error rates, and "cold write" operations.

36 Claims, 11 Drawing Sheets

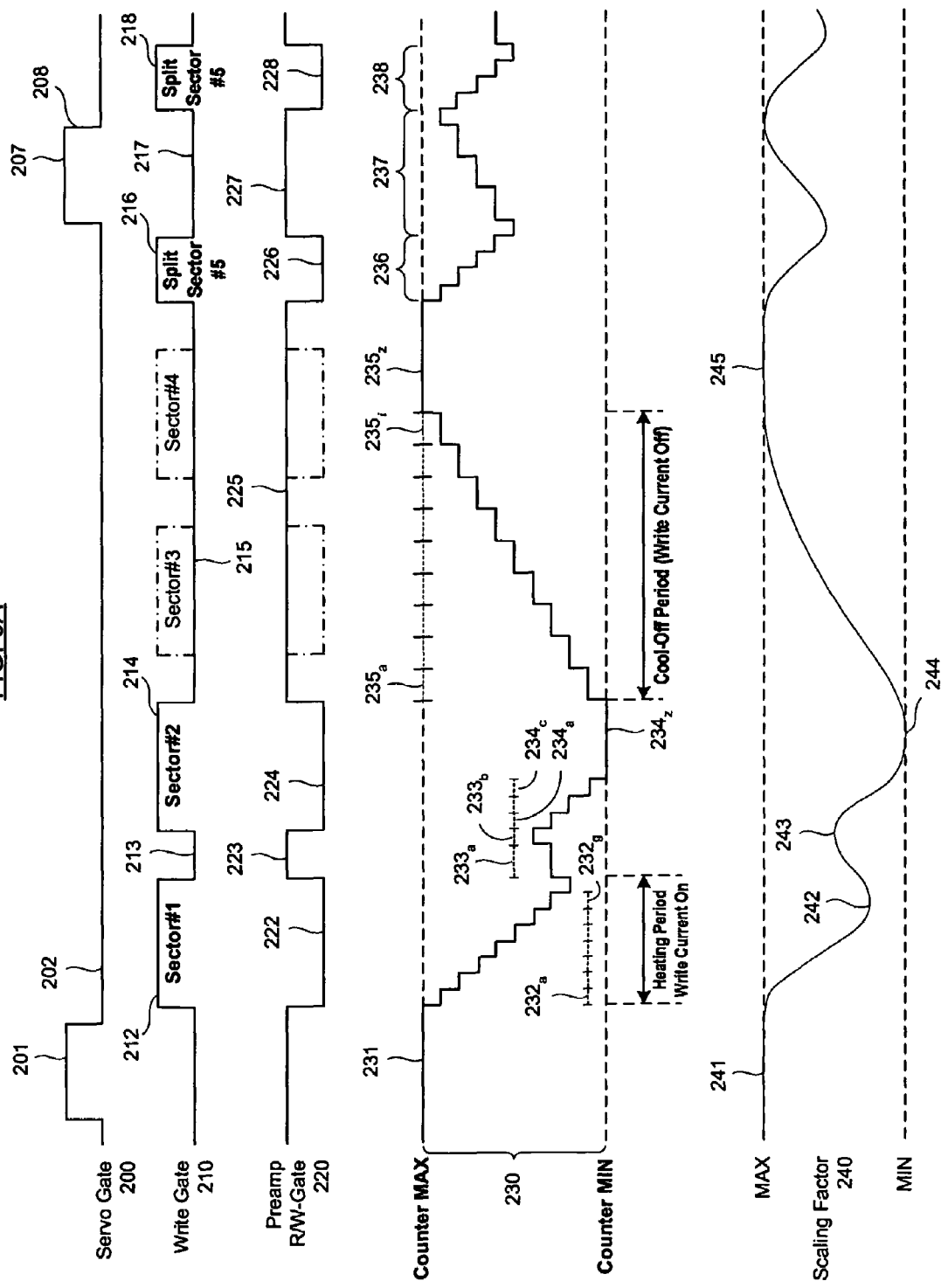

CIRCUITS, ARCHITECTURES, APPARATUS, SYSTEMS, AND METHODS FOR MAINTAINING CONSTANT SPACING IN A READ/WRITE APPARATUS FOR DATA STORAGE

RELATED APPLICATIONS

This application claims the benefit of U.S. Provisional Application No. 60/699,928, filed Jul. 15, 2005, incorporated herein by reference in its entirety.

FIELD OF THE INVENTION

The present invention generally relates to the field of reading data from and writing data to a data storage medium or device. More specifically, embodiments of the present invention pertain to circuits, architectures, systems, methods, algorithms and software for transferring data to and from a recording medium (particularly a magnetic recording medium) using a read/write head where spacing between must be maintained at a relatively constant value.

DISCUSSION OF THE BACKGROUND

Data storage media and mechanisms (e.g., disk drives) generally exhibit increasingly higher capacity devices to be competitive in the marketplace. As demands for data storage capacity increase, data bits (e.g., magnetically recorded bits) are generally packed more densely into the same recording medium dimensions to achieve higher capacity in the same form factor drive.

One of the fundamental parameters in the design of magnetic recording systems is the physical space between the recording head and the data recording medium (e.g., a rotating hard disk). The transducer in the head may perform both playback (read) and record (write) functions, and thus, may be known as a read/write head. The quality of recorded data bits (e.g., magnetic transitions) and the playback signal strongly depend on the clearance (or spacing) between the slider on the read/write head and the disk. This spacing is also known as flying height or the "fly height."

Various factors affect the read/write head-hard disk clearance during read and write operations, and can cause modulation of (or variances within) this spacing. In a magnetic data storage system, the speed of the disk rotation, the slider air bearing design, smoothness or roughness of the recording medium surface, operating altitude and temperature are some of the key factors.

FIG. 1 shows a conventional magnetic data recording and playback system 10, including read/write head 20 having write transducer (or coil) 30 and read transducer 40 electrically attached thereto. Electrical current passing through write coil 30 during a write operation generally heats the coil 30 and causes it to expand, reducing the spacing between write coil 30 and medium (or disk) 50. Protrusion of the recording element (write head) during the write process due to Joule heating and eddy-current losses may significantly reduce the flying height of sliders in hard disk drives. Such thermal expansion of the write coil 30 can also affect the position of the read transducer 40 relative to the disk 50. In some cases, the thermal expansion and contraction of the write coil 30 can be a primary factor in the variation of the fly height of the read/write head 20 and/or write coil 30.

After the recording system (e.g., through firmware in a disk drive) commands the drive servo to position the write head 20 on-track (e.g., at the beginning of a write operation) and a data read/write controller (such as a hard disk controller, or HDC) asserts a write enable signal (e.g., write gate or WG), a circuit such as a preamp sends current through the write head coil 30. The current passing through the coil 30 generates thermal power or energy, which causes the pole tip 35 to protrude towards the disk. The pole tip protrusion (PTP) generally reduces the magnetic spacing between the head and the disk 50.

On the other hand, when the write enable signal is deasserted, the current flow into or through) the write coil 30 is reduced or stopped, and the thermal energy stored in the pole tip 35 begins to dissipate into the air and the surrounding coil insulation material. The decay in thermal power (e.g., the rate of decrease in stored thermal energy in the coil 30) from the write operation causes the pole 35 tip to retract to its original position (e.g., to the original spacing). The rate of thermal power increase (during writing) and decay (when not writing) are different. This difference can create an undesirable modulation in spacing between the write head 20 or coil 30 and the data recording medium 50, which can impact the data integrity and bit error rate (BER) of the drive.

One method to adjust the fly height spacing between a magnetic recording medium and the read/write head involves thermally heating the transducer region (in the write head) with a heater element. However, after a write operation ends, current no longer passes through the coil 30, and the write coil 30 may begin to cool and contract. Importantly, the rate of thermal expansion during a write operation may not be the same as the rate of thermal contraction when current is not passing through the write coil 30. The different rates of thermal expansion and contraction give rise to a type of hysteresis in the fly height variation, generally as a function of actively writing data versus not writing data. Thus, it is believed that a simple heater element (that may not take the different rates of thermal expansion and contraction into account) may not be capable of maintaining the write coil 30 at a relatively constant distance above the data recording medium 50.

Furthermore, the start of a write cycle (known as "cold write") requires relatively high write current, when the coil temperature is relatively low, in order to overcome an increase in media coercivity. The write transducer-recording medium spacing modulation can be further complicated by the use of a heater element, as mentioned above.

A need therefore exists to reduce the variation and/or temperature-based modulation in write transducer fly heights, to keep up with ever-increasing demands for increased data densities and operational write speeds, as well as improved data integrity and reduced bit error rates, in high-speed data recording systems.

SUMMARY OF THE INVENTION

Embodiments of the present invention relate to circuitry, architectures, systems, methods, algorithms and software for adjusting spacing between a data recording mechanism and a data storage medium. The method generally comprises the steps of (a) determining a first length of time for a first write operation; (b) determining a second length of time between the first write operation and a second write operation; and (c) adjusting at least one state variable of a write signal provided to the data writing mechanism in accordance with the determining steps (a) and (b).

The circuitry generally comprises (a) adjustment logic configured to (i) determine a first length of time of a first write operation to a data storage medium, and (ii) determine a second length of time between the first write operation and a second write operation, (b) a controller configured to adjust at least one state variable of a write signal provided to a write mechanism adapted to transfer data to a data storage medium in accordance with the first and second lengths of time, and (c) an output circuit configured to provide the write signal to the write mechanism. The architectures and/or systems generally comprise those that include a circuit embodying one or more of the inventive concepts disclosed herein.

The present invention advantageously reduces adverse spacing modulation between a data writing mechanism (such as a write transducer or other data recording device having a pole or tip that protrudes from a write mechanism such as a read/write head) and the data storage medium when the data writing mechanism exhibits properties that differ as a function of time, depending on whether energy is applied to the data writing mechanism (e.g., during a write operation) or not (e.g., during operations other than writing). In turn, minimizing such spacing modulation can improve data integrity, reduce bit error rates, and enable "cold write" operations.

These and other advantages of the present invention will become readily apparent from the detailed description of preferred embodiments below.

BRIEF DESCRIPTION OF THE DRAWINGS

FIG. 3A is a diagram showing a series of waveforms representative of signals in an embodiment of the present invention.

DETAILED DESCRIPTION OF THE PREFERRED EMBODIMENTS

Figure 1:
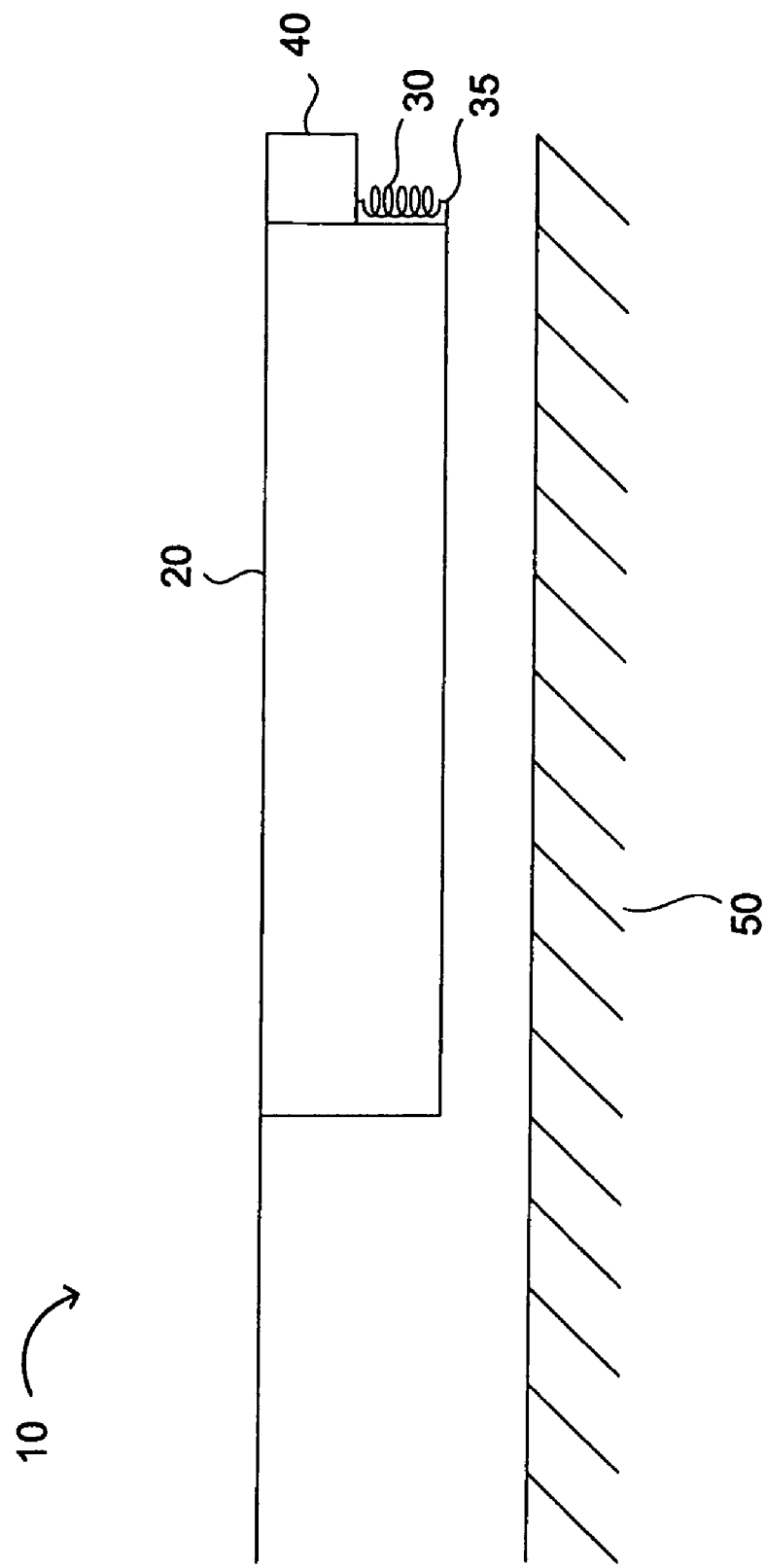
FIG. 1 is a diagram showing a conventional data recording system.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. The terms "power," "energy," "current," and "voltage" (and grammatical variations thereof) are also generally used interchangeably herein (e.g., the term "energy" is generally used herein to mean any of these terms), as are the terms "writing" and "recording" (e.g., the term "writing" is generally used herein to mean writing and/or recording), unless the context of the term's use unambiguously indicates otherwise, in which case the term is given its art-recognized meaning. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present invention concerns a method, algorithm, software circuit, architecture, and system for. The method generally comprises (a) determining a first length of time for a first write operation; (b) determining a second length of time between the first write operation and a second write operation; and (c) adjusting at least one state variable of a write signal provided to the data writing mechanism in accordance with the determining steps (a) and (b). The algorithm and/or software are generally configured to implement the present method and/or any process or sequence of steps embodying the inventive concepts described herein.

A further aspect of the invention concerns a circuit, generally comprising (a) adjustment logic configured to (i) determine a first length of time of a first write operation to a data storage medium and (ii) determine a second length of time between the first write operation and a second write operation, (b) a controller configured to adjust at least one state variable of a write signal provided to a write mechanism adapted to transfer data to the data storage medium in accordance with the first and second lengths of time, and (c) an output circuit configured to provide the write signal to the write mechanism. In certain embodiments, the adjustment logic may be configured to (i) decrease an energy to the write mechanism in accordance with the first length of time and (ii) increase the energy to the write mechanism in accordance with the second length of time (e.g., of a non-write operation), and the controller may be configured to independently control the increase and decrease in energy to the write mechanism. In many cases, the increase in energy (e.g., during write operations) differs from an absolute value of the decrease in energy (e.g., during non-write operations). The architecture generally comprises the present circuit and/or any circuit embodying the inventive concepts described herein. The system generally comprises the present circuit and a write mechanism configured to receive a write signal from the present circuit.

While the invention enjoys particular advantage in magnetic recording systems and in writing data to magnetic recording media, the invention may be used in any data recording system or with any recording medium that employs a transducer or other type of data writing mechanism having properties that depend on the distance between the writing mechanism and the recording medium, and/or that experience changes in properties dependent on the direction of change (e.g., increase versus decrease) in energy provided to the writing mechanism. The invention, in its various aspects, will be explained in greater detail below with regard to exemplary embodiments.

Exemplary Methods of Adjusting Spacing in a Recording System

In one aspect, the present invention relates to a method of adjusting spacing between a data recording mechanism and a data storage medium, comprising the steps of (a) determining a first length of time for a first write operation; (b) determining a second length of time between the first write operation and a second write operation; and (c) adjusting at least one state variable of a write signal provided to the data writing mechanism in accordance with the determining steps (a) and (b) (e.g., in accordance with the first and second lengths of time). In various embodiments, the state variable comprises a boost current, a boost time, or a write current; adjusting the state variable of the write signal comprises applying first and second scaling factors, the first scaling factor being applied during the first length of time, and the second scaling factor being applied during the second length of time; the state variable comprises a write signal current that cannot can exceed predetermined (e.g., programmed) maximum and minimum values; and/or the data storage medium comprises a magnetic data storage medium. In a further and/or additional embodiment, the step of adjusting the state variable may comprise controlling a steady-state current or an overshoot current provided to the data recording mechanism.

In one exemplary embodiment, the state variable is adjusted in accordance with a thermal time constant of expansion of the data recording mechanism during a write operation and/or a thermal time constant of contraction of the data recording mechanism during the second length of time (e.g., the length of time for a non-write operation). Thus, the first scaling factor may be correlated to the thermal time constant of expansion, and the second scaling factor may be correlated to the thermal time constant of contraction, which often differ for certain material(s) in a given data recording mechanism. As explained above, typical write transducers (and/or other data writing mechanisms) may be made using materials that have different rates of thermal expansion and contraction. The inventive method enables maintaining a relatively constant spacing between the write head (or transducer) and the recording medium (e.g., hard disk), regardless of whether the write head is expanding due to current passing through it during a write operation or contracting due to a lack of current passing through it during a non-write operation.

Thus, in one implementation, the step of adjusting the state variable and/or applying the scaling factor comprises decrementing the write current at a first rate (e.g., reducing the current to the write mechanism by a predefined or predetermined amount per predefined or predetermined unit of time). For example, decrementing the applied current may comprise changing (e.g., incrementing or decrementing) a counter every first predetermined period of time during the write operation, and/or reducing the applied current by a first predetermined current value in response to one or more predetermined counter changes. Similarly, the step of adjusting the state variable and/or applying the scaling factor may comprise incrementing a write current at a second rate. For example, incrementing the applied current may comprise changing (e.g., incrementing or decrementing) a counter every second predetermined period of time during time between the first and second write operations (e.g., the non-write operation), and/or increasing the applied current by a second predetermined current value in response to one or more predetermined counter increments.

Another implementation of the present method involves further adjusting the state variable and/or applying the scaling factor to the data writing mechanism during an active servo gate operation. Due to the relatively short duration of servo access (or "wedge") times, it is generally preferred to continue decrementing the current as if the servo access operation is a write operation. However, one can easily hold or "freeze" a counter in a certain state in response to an appropriate control signal, as is known in the art. One skilled in the art can also program a circuit (e.g., using a predetermined bit in a configuration register) to either continue decrementing the energy or current to the write mechanism as if the servo access operation is a write operation, or hold the power, energy or current to the write mechanism at an initial value during the servo access operation.

In an alternative and/or additional embodiment, the write operation may comprise a cold write operation, in which case the scaling factor may be correlated to a coercivity of the data storage medium. Conventionally, in a magnetic data recording system, the start of a write operation is delayed (usually on the order of microseconds or milliseconds) until sufficient current is provided to the write mechanism to overcome the coercivity of the recording medium (e.g., hard disk) and reliably write data thereto. In this embodiment, the present invention ensures that so-called "cold write" operations (e.g., writing data to a recording medium at a time when substantially no current is provided to the write mechanism and/or the write mechanism is at a relatively low temperature) can be conducted reliably without use of a pre-write delay.

Figure 2:
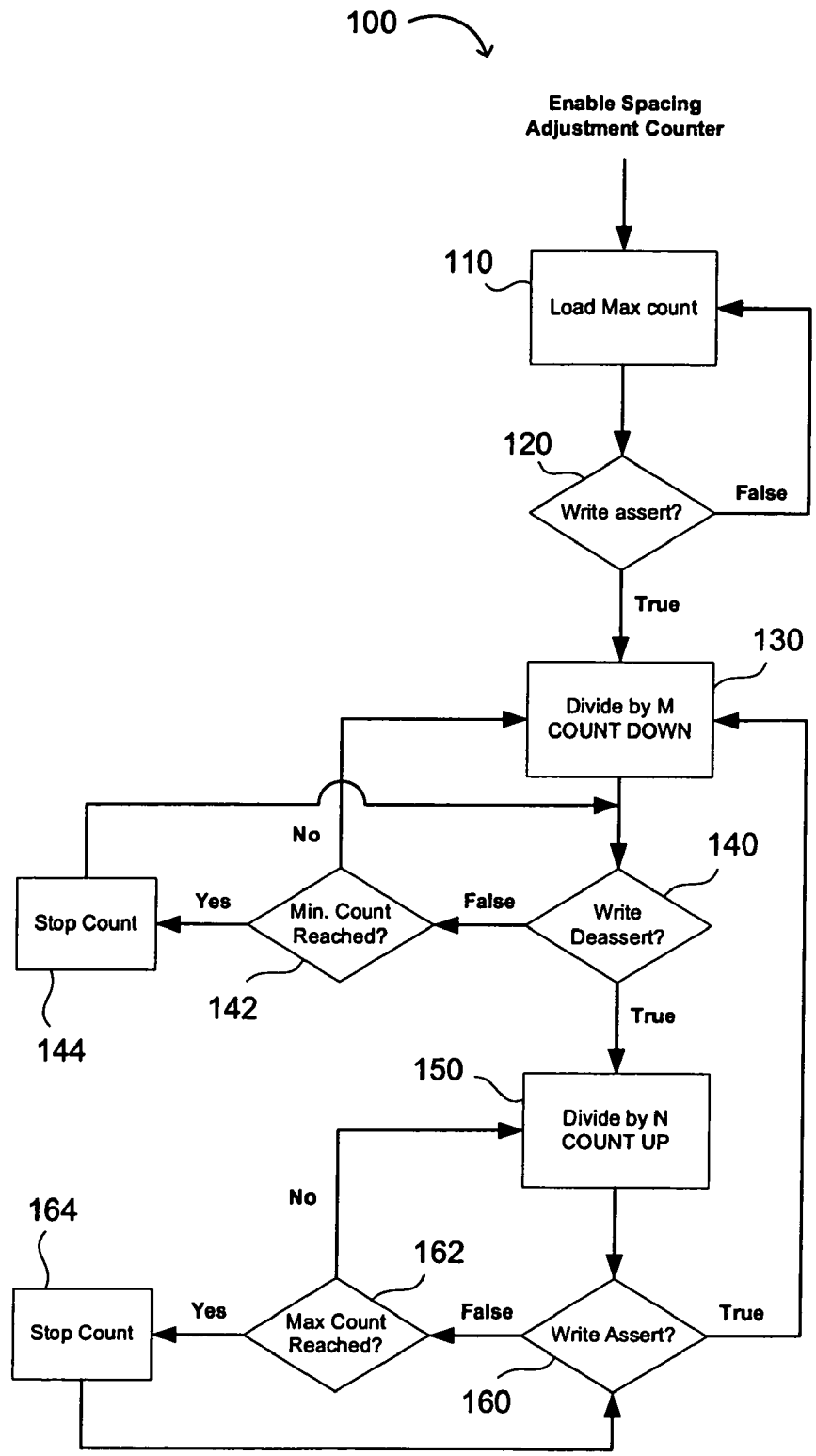
FIG. 2 is a flow chart showing an embodiment of the present method of adjusting for spacing modulation between a write head and a data recording medium.

The method may be more easily and/or completely understood when explained with reference to an example. FIG. 2 shows a flow chart 100 for an exemplary embodiment of the present method using an up/down counter to control changes in energy (e.g., current) to a mechanism adapted to write data to a magnetic medium.

The method 100 begins by enabling an up/down counter configured to adjust the spacing (e.g., the fly height) between the write mechanism and the recording medium. Typically, enabling comprises asserting an active enable signal that is received at an enable input of the counter. In step 110, the maximum count value (e.g., corresponding to the maximum power, energy or current) is loaded into the counter, and the system (or write circuitry) is checked to see if a write operation is enabled. At step 120, the method determines whether a write operation is active. Typically, if a write enable signal is not asserted or in an active state (or, conversely, a read enable signal is asserted or in an active state), then the counter does not change, and the system (e.g., the write circuitry) is monitored for an active and/or enabled write operation.

However, if a write enable signal is asserted or in an active state as shown in step 120 (or, conversely, a read enable signal is deasserted or in an inactive state), then in step 130, the counter begins to count down from the maximum value on each cycle of the counter clock. The counter clock signal is generally derived by dividing a reference clock signal by a predetermined value M to create the predetermined delay (or unit time) between decrements of the counter. Alternatively, the counter clock signal may be derived by multiplying or dividing the reference clock signal by a ratio $P_m/Q_m$ (see the discussion of FIG. 5B below). Correspondingly, the power, energy or current to the write mechanism is decreased by a predetermined amount upon each decrement of the counter.

In step 140, the system (e.g., the write circuitry) is monitored for an inactive and/or non-enabled write operation (e.g., by determining the state of a write and/or read enable signal). As long as the write operation is active and/or enabled, the counter continues to count down, and the power, energy or current to the write mechanism continues to decrease by a predetermined amount upon each decrement of the counter. The predetermined amount of the decrease in power, energy or current does not have to be the same for each decrement of the counter over the entire range of the counter (i.e., from maximum count value to minimum count value). For example, during a "cold write" operation, a first group of counts or decrements can change the current by a relatively small amount, and a second or subsequent group (e.g., the remainder) of the counts or decrements can change the current by a relatively large amount. For example, if the conventional "cold write" delay is about 1 msec and the predetermined time period between counts or decrements is about 100 μsec, then the first 10±1 counts or decrements can change the current by a relatively small amount (e.g., 0.25-2%), and the remainder of the counts or decrements (which can be from about 20 to about 50) can change the current by a relatively large amount (e.g., from about 2 to about 5%). The adjustment logic (see the discussion of FIGS. 4 and 5A below) can be further configured to wait for a predetermined period of time following the occurrence of a maximum count value before indicating that a subsequent write operation is a "cold write" operation.

Also, as long as the write operation is active and/or enabled, the system or write control circuitry (and in one embodiment discussed below, the adjustment control logic or state machine) monitors the counter until the minimum count value is reached (see decision block 142). As long as the minimum count value has not been reached, the counter keeps counting down. Once the minimum count value is reached, however, the counter stops (event block 144) until the write operation stops (e.g., an inactive and/or deasserted write enable signal is detected; "True" result at decision block 140).

When the write operation stops (e.g., an inactive and/or deasserted write enable signal and/or an active and/or asserted read enable signal is detected), the up/down counter then begins at step 150 to count up from the value at the end of the write operation (which may be the minimum count value) on each cycle of the counter clock. In this case, however, the counter clock signal changes, and is generally derived by dividing the reference clock signal (which may be the same as or different from the reference clock signal used during the write operation) by a predetermined value N to create a different predetermined delay (or unit time) between increments of the counter. Alternatively, the counter clock signal may be derived by multiplying or dividing the reference clock signal by a ratio $P_n/Q_n$ (see the discussion of FIG. 5B below). Correspondingly, the power, energy or current to the write mechanism is increased by a different predetermined amount upon each increment of the counter.

Similarly to step 140, the system (e.g., the write circuitry) is then monitored in step 160 for an active and/or enabled write operation (e.g., by determining the state of a write and/or read enable signal). As long as the write operation is inactive and/or not enabled, the counter continues to count up, and the power, energy or current to the write mechanism continues to increase by a predetermined amount upon each increment of the counter. However, the thermal time constant of expansion of the data recording mechanism during the write operation generally differs from the thermal time constant of contraction of the data recording mechanism during the non-write operation. In most cases, the thermal time constant of expansion is greater than the thermal time constant of contraction. As a result, the rate of increase in the current provided to the data recording mechanism as it contracts should be smaller than the rate of decrease in the current provided to the data recording mechanism as it expands (excluding any decreases during a "cold write" operation). Thus, if the change in power, energy or current provided to the write mechanism is the same in the non-write operation as the write operation, the unit time between increments of the counter will be greater than the unit time between decrements of the counter. Alternatively, if the unit time between increments and decrements of the counter is substantially the same, the absolute value of the change in power, energy or current provided to the write mechanism will be greater during a write operation than the absolute value of the change in power, energy or current provided to the write mechanism during the non-write operation. Similarly to the write operation, the predetermined amount of the increase in power, energy or current does not have to be the same for each increment of the counter over the entire range of the counter (i.e., from maximum count value to minimum count value).

Also, as long as the write operation is inactive and/or not enabled, the system or write control circuitry (and in one embodiment discussed below, the adjustment control logic or state machine) monitors the counter until the maximum count value is reached (see decision block 162). As long as the maximum count value has not been reached, the counter keeps counting up. Once the maximum count value is reached, however, the counter stops (event block 164) until a write operation starts (e.g., an active and/or asserted write enable signal is detected; "True" result at decision block 160). At that point, the method/flow goes back to "count down" step 130.

Figure 3B:
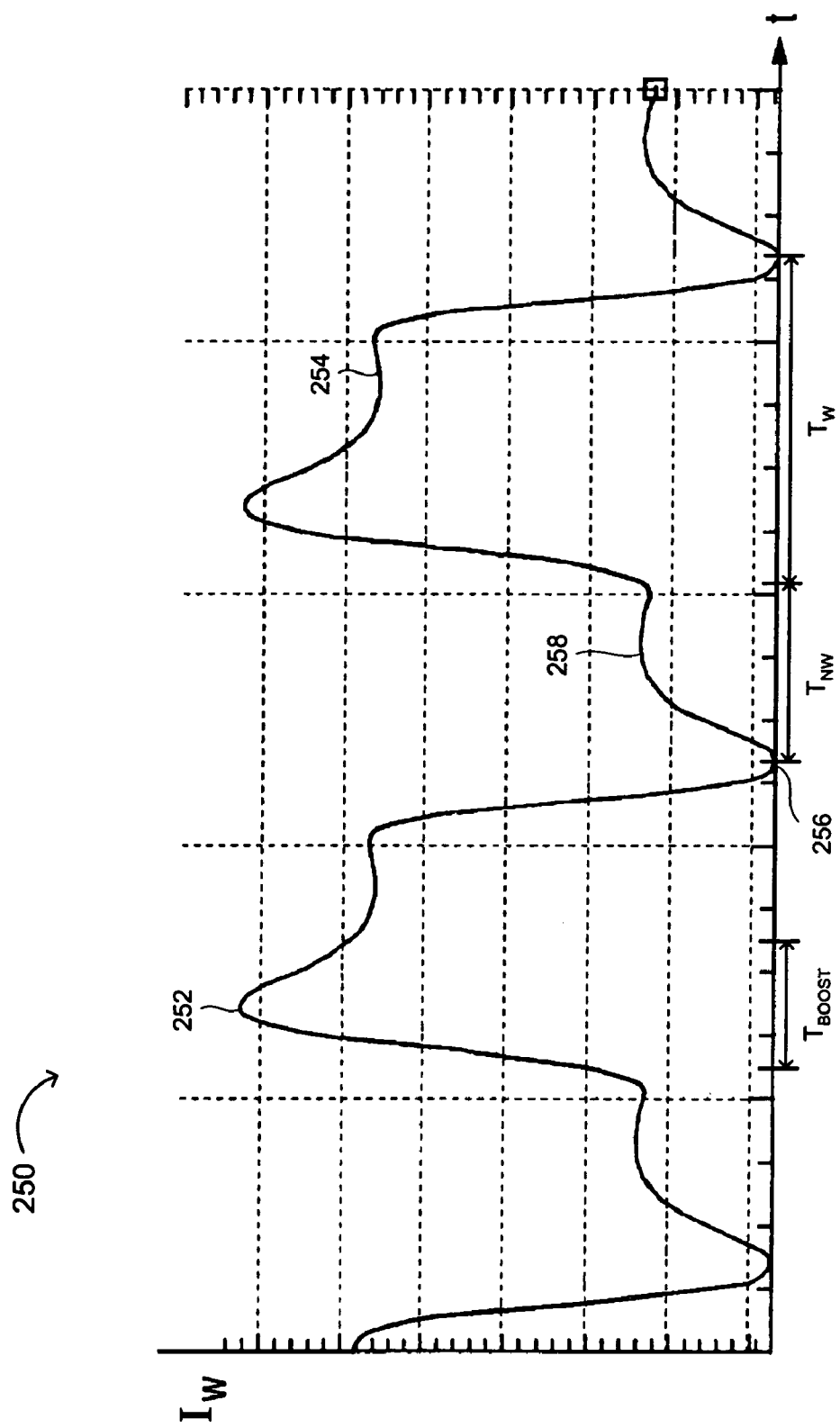
FIG. 3B is a diagram showing a waveform representative of a write signal in an embodiment of the present invention.

FIG. 3A shows a number of waveforms of various signals in the present system that may also be useful in understanding the operation of the present method. Consistent with conventional operations of a magnetic recording system, the recording system (e.g., hard disk drive firmware) may command or instruct the drive servo to position the write mechanism (e.g., a read/write head) for a write operation by an assertion 201 of a servo gate signal 200, as shown in FIG. 3A. The count 230 in the up/down counter is initially at its maximum 231, as explained above. After the servo gate signal is deasserted 202, a write operation is enabled or initiated by assertion 212 of a write gate 210 (active in a high digital logic state in the example of FIG. 3A) and/or assertion 222 of preamplifier read-write gate signal 220 (where write operations are active in the low digital logic state in the example of FIG. 3). At that point (or, alternatively, about one write counter clock cycle or delay period later), the up/down counter begins to count down, decreasing the count 230 by one for each predetermined period of time 232a-g (e.g., write counter clock cycle or delay period) during the active write operation to sector #1 in the recording medium. In a preferred embodiment, the counter begins to count down in response to assertion of the write gate 210. Correspondingly, the scaling factor 240 provided to the write transducer goes from a maximum value ("Counter MAX") 241 at the beginning of the write operation to sector #1 to an intermediate value 242 at the end of the write operation to sector #1. The scaling factor is generally applied to a write signal parameter (such as write current or other state variable of the write signal, for example a boost current or a length of time of the boost current; see the discussion of FIG. 3B below) so that the parameter has a value reflective of the scaling factor.

Referring back to FIG. 3A, during the brief time period 213 between writing to sector #1 and sector #2 (e.g., as the recording system locates the starting address or position of sector #2, an exemplary non-write operation), the write gate 210 is deasserted, the preamplifier read-write gate signal 220 transitions to a high digital logic state 223 (disabling or inactivating any write operations), and the up/down counter begins to count up (either immediately as shown in FIG. 3 or after about one non-write counter clock cycle or delay period), increasing the count 230 by one for each predetermined period of time 233a or fraction thereof 233b (e.g., the non-write counter clock cycle or delay period) during the non-write operation. Correspondingly, the scaling factor 240 applied to the signal provided to the write transducer goes from a relatively low intermediate value 242 at the beginning of the time period 213 to a relatively high intermediate value 243 at the end of the time period 213. One skilled in the art is capable of empirically determining suitable time periods for the write counter clock and the non-write counter clock cycles that correlate to predetermined adjustments in current, power or energy to the write mechanism in accordance with the present disclosure.

The write operation cycle repeats itself when writing to sector #2 of the recording medium. The second write operation is enabled or initiated by assertion 214 of write gate 210 and/or preamplifier read-write gate signal 220 transitioning to low digital logic state 224. At that point (or, as discussed above, about one write counter clock cycle or delay period later), the up/down counter begins to count down, decreasing the count 230 by one for each predetermined period of time 234a-c (e.g., the write counter clock cycle or delay period, which is the same during the write operation to sector #2 as during the write operation to sector #1). However, during the write operation to sector #2, the count reaches its minimum value ("Counter MIN") 234z. Correspondingly, the scaling factor 240 goes from an intermediate value 243 at the beginning of the write operation to sector #2 to a minimum value 244 at the end of the write operation to sector #2.

In the example of FIG. 3A, sectors #3 and #4 are not written. As a result, the write gate 210 is deasserted 215, and the preamplifier read-write gate signal 220 transitions to a high digital logic state 225 (disabling or inactivating any write operations). Thereafter, the up/down counter begins to count up (either immediately as shown in FIG. 3A or after about one non-write counter clock cycle or delay period), increasing the count 230 by one for each predetermined period of time 235a-i (e.g., the non-write counter clock cycle or delay period) during the non-write operation. The length of the predetermined period of time 235a-i during a non-write operation is longer than (and substantially different from) the length of the predetermined period of time 232a-g during a write operation. In such a case, the time constant of thermal expansion of the write mechanism is greater than the time constant of thermal contraction. Of course, for a write mechanism where the time constant of thermal expansion is less than the time constant of thermal contraction, the time period between counts during a write operation will be longer than the time period between counts during a non-write operation.

In the example of FIG. 3A, the change in current resulting from a change in the count is generally the same, whether the change occurs during a write operation or a non-write operation. Alternatively, however, the time period between counts during a non-write operation may be substantially the same as the time period between counts during a write operation, but the amount that the power, energy or current provided to the write mechanism changes in response to a change in the count during a write operation may differ from the corresponding amount that the power, energy or current changes during a non-write operation. Also, one can easily envision a system in which the minimum count corresponds to a maximum current, and vice versa, in which case the counter increments the count during a write operation and decrements the count during a non-write operation.

Eventually, during non-write operation 215, count 230 reaches the maximum count 235z, due to the length of the non-write operation 215 exceeding the product of the predetermined period of time 235a and the value of the maximum count 235z. Correspondingly, the scaling factor 240 provided to the write transducer goes from the minimum value 244 at the beginning of the non-write operation 215 to its maximum value 245 during the non-write operation 215. However, the slope of the scaling factor curve 240 during a non-write operation in this example is smaller than (and substantially different from) the absolute value of the slope of the scaling factor curve 240 during a write operation. Naturally, variations are possible, depending on the material and/or configuration of the write mechanism (e.g., the rate of dissipation of the thermal energy in the read/write pole tip into the air and/or surrounding insulation), the form of power or energy provided to the write mechanism, the particular recording medium, the write operation or write mechanism parameter to be adjusted, etc. As a result, the slope of the scaling factor curve 240 during a non-write operation may be greater than or (substantially) equal to the absolute value of the slope of the scaling factor curve 240 during a write operation. In addition, the value of the change in the state variable (or write signal parameter) resulting from one or more predetermined increments and/or decrements can be the same or different, and can result in a linear or non-linear scaling factor curve 240.

In the example of FIG. 3A, a servo access to the recording medium occurs while writing to sector #5. As a result, the write operation to sector #5 is "split," or performed partially before and partially after assertion 207 of servo gate signal 200. As shown in FIG. 3A, shortly before assertion 207 of servo gate signal 200, the write gate 210 transitions from an asserted or active state 226 to a deasserted or inactive state 217, and the preamplifier read-write gate signal 220 transitions from a high digital logic state 226 to a low digital logic state 227. In response to at least the transition of write gate 210 to inactive state 217, the up/down counter stops counting down (as it was doing during the first write operation 236 to sector #5) and begins to count up (either immediately as shown in FIG. 3A or after about one non-write counter clock cycle or delay period), increasing the count 230 by one for each non-write counter clock cycle or delay period during the non-write time period 237.

Alternatively, during active servo access operation/servo gate signal assertion 207, the count may be decremented (as if the servo access is a write operation), resulting in a substantially constant decrease in current 240, or held constant, resulting in a substantially constant value for current 240 during the time of the servo operation. If the servo access time periods are sufficiently short and the typical times for write operations are sufficiently long, then one can determine at the time of recording system assembly whether to program (e.g., using one or more configuration register bits) the counter control circuitry to either continue decrementing the count, hold the count at a present value, or increment the count during a servo access operation.

Referring back to FIG. 3A, shortly after de-assertion 208 of servo gate signal 200, the write gate 210 transitions to an asserted or active state 228, and the preamplifier read-write gate signal 220 transitions to a high digital logic state 228 (further enabling a write operation). In response to at least the transition of write gate 210 to active state 218, the up/down counter stops counting up and begins to count down, either immediately (as shown in FIG. 3A) or after about one "write count" period of time, decreasing the count 230 by one for each write counter clock cycle or delay period during the write operation time period 238.

FIG. 3B shows a graph 250 of the write current as a function of time for an exemplary embodiment of the present invention. The boost current ($I_{Boost}$) is exemplified by current peak 252 during the boost time $T_{Boost}$. Typically, the boost time $T_{Boost}$ is the first part of the write time period $T_W$ (shown in a second write operation cycle for clarity), during which the write current has a relatively high value. After the boost time ends, the write current ($I_W$) has an intermediate value 254. Immediately before the write operation ends (see, e.g., the right arrow point in $T_W$), the write current decreases to a minimum value 256, then during the non-write portion of the cycle, the write current has a relatively low value 258. In certain embodiments, the write signal state variables that are adjusted are selected from the group consisting of the boost time, boost current, and the write current, although other write signal state variables (such as the non-write current, the length of time for the write current decrease at the end of the write operation, the rate of change between the current values shown in FIG. 3B, etc.) can also be adjusted using the present invention.

Exemplary Algorithm(s) and/or Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium or waveform comprises at least one instruction to (1) input a multi-bit signal into an adjustment control logic (e.g., a counter or delay circuit), the multi-bit signal having a first value correlated to a length of time of the write operation, and a second value correlated to a length of time of the non-write operation (or a length of time between first and second successive write operations), the first value differing from the second value; and/or (2) input into the adjustment control logic predetermined (e.g., programmed) maximum and minimum values for the power or energy. In one exemplary embodiment, the first multi-bit signal value is based on a thermal time constant of expansion of the data recording mechanism during the write operation, and the second value is based on a thermal time constant of contraction of the data recording mechanism during the non-write operation.

Thus, in one implementation, the computer-readable medium or waveform may further comprise at least one instruction to change a counter value every first predetermined period of time during the write operation, reduce a current applied to the write mechanism by a first predetermined amount in response to one or more predetermined counter changes during the write operation, change a counter value every second predetermined period of time during the non-write operation, and/or increase the applied current by a second predetermined amount in response to one or more predetermined counter changes during the non-write operation. The second predetermined amount of current change may differ from the first predetermined amount of current change, and such amounts (or their relative magnitude or ratio) can also be programmed.

As explained in large part above, the computer-readable medium or waveform may further comprise at least one instruction to continue decreasing the current to the write mechanism during a servo access or servo gate operation (e.g., by decrementing a counter), to hold the current to the write mechanism at a present value during the servo access/servo gate operation (e.g., at its value when the servo access/servo gate operation begins), or to increase the current to the write mechanism during a servo access or servo gate operation (e.g., by incrementing a counter).

In an alternative and/or additional embodiment, the computer-readable medium or waveform may further comprise at least one instruction to adjust the write current by a first, relatively small amount during the first part of a write operation that initially applies a maximum current (e.g., corresponding to a cold write operation, when substantially no current is provided to the write mechanism and/or the write mechanism is at a relatively low temperature), and by a second, relatively large amount during a second or subsequent part of the write operation, as described herein. The computer-readable medium or waveform may further comprise at least one instruction to wait for a predetermined period of time following the occurrence of a maximum count value (or maximum power, energy or current) before indicating that the instruction to adjust the first current by a first, relatively small amount during the first part of a subsequent write operation is active or operational.

An Exemplary Circuit and/or Architecture

The present invention also relates to a circuit, comprising (a) adjustment logic configured to (i) determine a first length of time of a first write operation to a data storage medium and (ii) determine a second length of time between the first write operation and a second write operation, (b) a controller configured to adjust at least one state variable of a write signal provided to a write mechanism adapted to transfer data to the data storage medium in accordance with the first and second lengths of time, and (c) an output circuit configured to provide the write signal to the write mechanism. Thus, the present circuit may also comprise (1) means for adjusting at least one state variable of a write signal provided to a write mechanism adapted to transfer data to a data storage medium, (2) means for determining (i) a first length of time of a first write operation to the data storage medium and (ii) a second length of time length of time between the first write operation and a second write operation, and (3) means for providing the write signal to the write mechanism. In certain embodiments, the controller may be configured to apply one or more scaling factors to the state variable of the write signal. In addition, the write signal state variable may comprise a member selected from the group consisting of a boost current, a boost time, and a write current.

Figure 4:
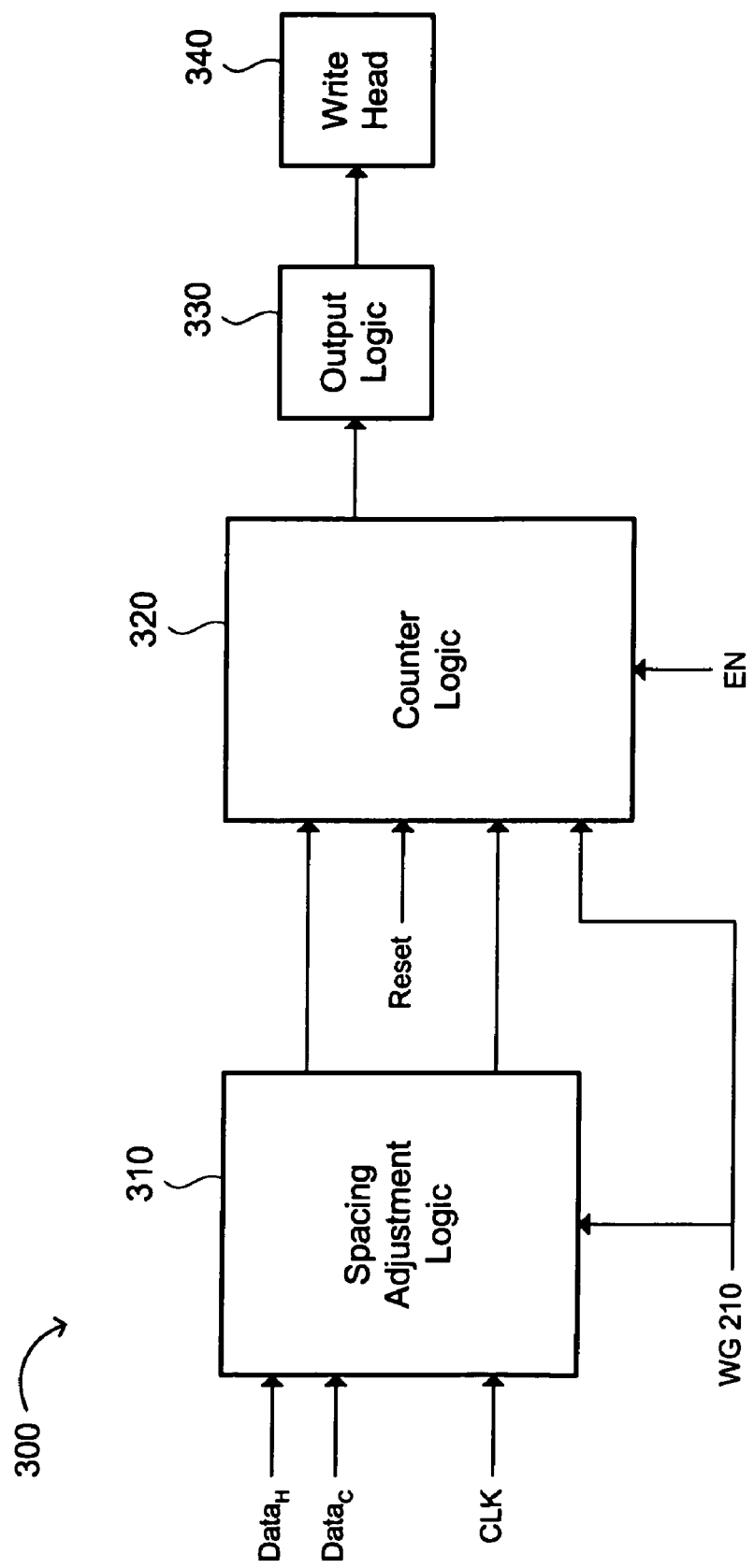
FIG. 4 is a block diagram of an embodiment of the present spacing adjustment (or "counter-modulation") circuit/architecture.

FIG. 4 shows a first exemplary embodiment 300 of the present circuit and/or architecture, including spacing adjustment logic 310, counter logic 320, output logic 330 and write mechanism (e.g., write head) 340. The present circuit enjoys particular advantage when the data storage medium comprises a magnetic data storage medium. Spacing adjustment logic 310 and counter logic 320 may provide or constitute at least part of a controller for adjusting the power, energy or current in the write mechanism 340 (e.g., in particular, a write coil) to compensate for differences in thermal time constants of expansion and contraction when the write mechanism 340 heats up and cools off, as well as for conducting cold write operations. The counter logic 320 may be configured effectively to keep track of the time during and between write operations, and to adjust the write power level provided to the write mechanism 340 accordingly. Output logic 330 may be configured to control the power into the write mechanism 340 (e.g., the write head coil) by either controlling the steady-state current or an overshoot (or "boost") current (see, e.g., FIG. 3B). It is well within the abilities of one skilled in the art to design and use output circuitry configured to control steady-state and/or overshoot current(s).

Referring back to FIG. 4, spacing adjustment logic 310 is generally configured to provide a mechanism or means for controlling the rate and direction of change in applied power (e.g., current provided to the write mechanism 340). In one exemplary embodiment, spacing adjustment logic 310 may receive data representative of and/or correlated to the thermal expansion of the write mechanism 340 as a function of write operation time (e.g., "$Data_H$"). By gradually decreasing the power or current to the write mechanism 340 as the write operation progresses, adverse effects from modulations in the spacing between write mechanism 340 and the data storage medium (e.g., the fly height) as write mechanism 340 heats up may be reduced or minimized, data integrity may be improved, and bit error rates may be reduced. Where the coefficient of thermal expansion of the write mechanism 340 is not constant over an expected range of operational temperatures, the data may include one subset of data correlated to a first temperature range where the coefficient of thermal expansion is relatively constant, a second temperature range where the coefficient of thermal expansion is different from that of the first range, a third temperature range where the coefficient of thermal expansion is relatively constant and/or different from that of the first two ranges, etc. The data may reflect a time period or delay between adjustments or changes in the applied power, energy or current, and/or one or more magnitudes, values or relative variations in the amount of the change in the applied power, energy or current. Where the data contains a plurality of subsets, each of the subsets may reflect a unique time period or delay between adjustments or changes and/or a unique amount of change in the applied power, energy or current.

Similarly, spacing adjustment logic 310 may receive data representative of and/or correlated to the thermal contraction of the write mechanism 340 as a function of non-write operation time (e.g., "$Data_C$"). By gradually increasing the power or current to the write mechanism 340 as the write operation progresses, adverse effects from modulations in the spacing between write mechanism 340 and the data storage medium (e.g., the fly height) as write mechanism 340 heats up may be reduced or minimized, data integrity may be improved, and bit error rates may be reduced. However, generally, the coefficient of thermal contraction of the write mechanism 340 is not the same as the coefficient of thermal expansion, so the data correlated to the thermal contraction of the write mechanism 340 ($Data_C$) differs from the data correlated to the thermal expansion of the write mechanism 340 ($Data_H$). As for $Data_H$, where the coefficient of thermal contraction of the write mechanism 340 is not constant over an expected range of operational temperatures, the data may include one subset of data correlated to a first temperature range where the coefficient of thermal contraction is relatively constant, a second temperature range where the coefficient of thermal contraction is different from that of the first range, a third temperature range where the coefficient of thermal contraction is relatively constant and/or different from that of the first two ranges, etc. The data may also reflect the time period or delay between adjustments or changes in the applied power, energy or current, and/or the magnitude, value or relative variation in the amount of the change in the applied power, energy or current. Where the data contains a plurality of subsets, each of the subsets may reflect a unique time period or delay between adjustments or changes and/or a unique amount of change in the applied power, energy or current.

Spacing adjustment logic 310 is also generally configured to receive one or more control signals (discussed in greater detail below) and a periodic signal (e.g., clock signal CLK) as a mechanism or means for providing the first and second predetermined time period or delays between adjustments or changes in the applied power, energy or current. Thus, the adjustment logic may receive one or more periodic signals. In one exemplary embodiment, the data representative of and/or correlated to the thermal expansion and contraction of the write mechanism 340 (e.g., Data$_H$ and Data$_C$) comprise first and second (different) clock divider values or ratios, and the time periods between power/current adjustments are determined by the period or frequency of the periodic signal and the corresponding clock divider value or ratio, as is known in the art. Each of Data$_H$ and Data$_C$ may comprise one or more programmable bits [e.g., from 4 to 16], depending on the desired divider value or clock multiplier ratio and the period of the reference clock. Similar to the above description, the data may include one divider value correlated to a first part of the write or non-write operation, a second divider value correlated to a second (e.g., subsequent) part of the write or non-write operation, etc. Of course, it is well within the abilities of those skilled in the art to design and implement other circuits or devices configured to generate characteristic delays that can be regularly repeated and that can serve as control signals for changing a parameter value by a certain (e.g., predetermined) amount.

Counter logic 320 generally receives a plurality of outputs from spacing adjustment logic 310, a reset signal and an enable signal. In one embodiment, the counter logic 320 comprises an up-down counter, but it can also comprise any device or circuit configured to change an output parameter by a predetermined amount after one or more predetermined time periods, depending on an active or inactive state of an operation or control signal enabling such operation. In one implementation, counter logic 320 comprises an up/down counter circuit with a programmable count rate and/or programmable delay, coupled to and/or receiving one or more control signals (e.g., the gate signals described herein with respect to FIGS. 3A and 5A, such as write gate 210) from the recording system (e.g., a hard disk controller) that increment or decrement the count and adjust the write power or current, preferably not to exceed pre-programmed saturation levels (e.g., minimum and maximum values).

The counter logic 320 may be advantageously implemented in (or integrated with) a preamplifier circuit, considering noise issues. Noise is generally of lesser concern during write operations (which are carried out using a preamplifier) than during read operations (such as a servo access operation, under an asserted or active servo gate signal). Thus, when the counter circuit is active (which it can be during either a write or a read operation), any resulting noise will have less adverse effects in a preamplifier circuit than in a servo circuit. As a result, the present circuit may be embodied on a single integrated circuit, optionally further comprising one or more preamplifier circuits.

Figure 5A:
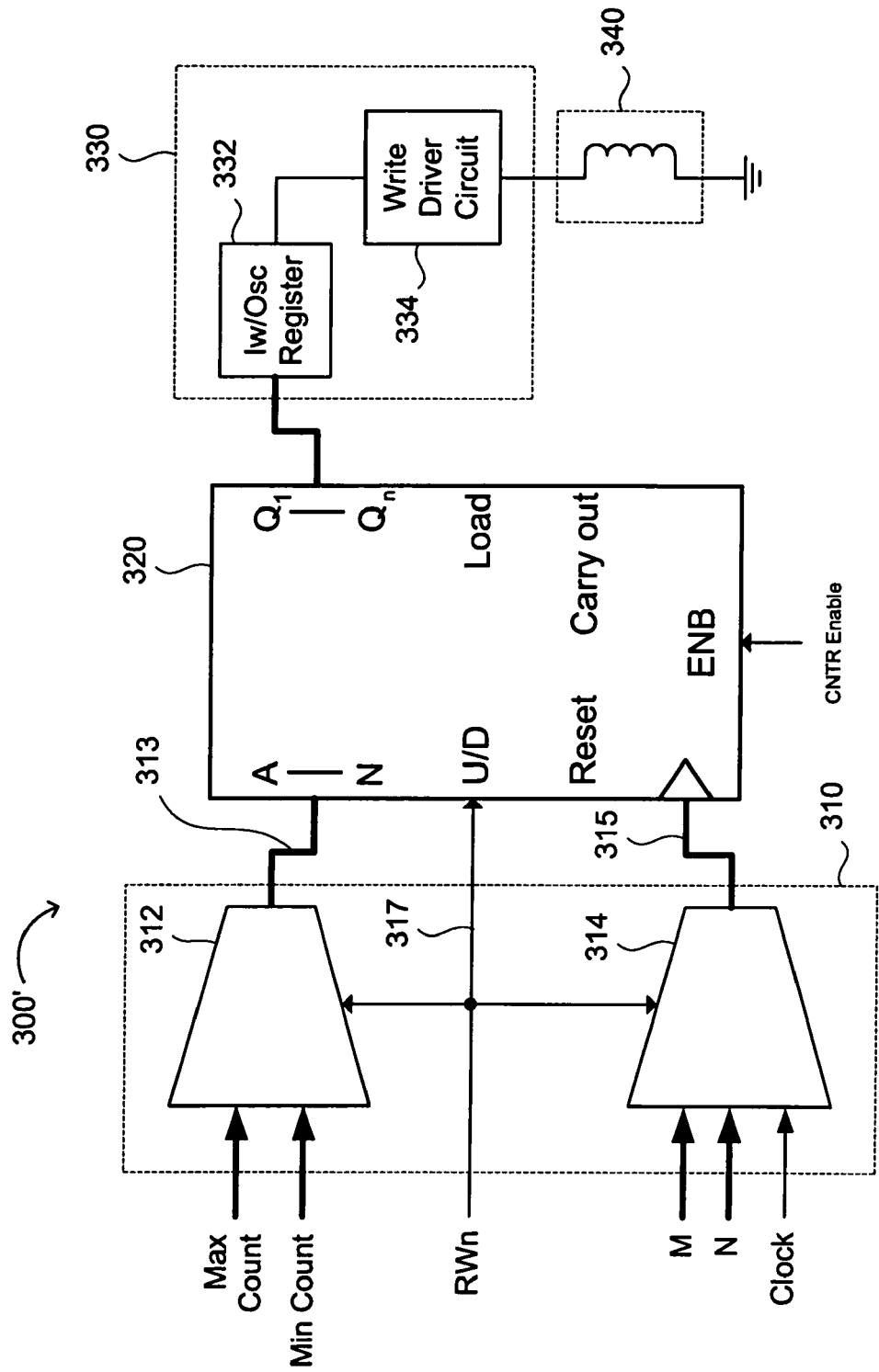
FIG. 5A is a schematic diagram of a preferred implementation of the present spacing adjustment (or "counter-modulation") circuitry.

FIG. 5A shows a more detailed embodiment 300' of the present circuit. Spacing adjustment logic 310 may comprise a multiplexer 312 receiving minimum and maximum count values and a multiplexer/divider 314 receiving a clock signal Clock and clock divider data M and N. Each of the multiplexer 312 and the multiplexer portion of multiplexer/divider 314 are controlled by a write enable signal (e.g., read/write enable signal RWn) 317. Depending on the state of write enable signal 317 and the relationship of the count direction (e.g., up or down) to the direction of change in the applied power/current, multiplexer 312 outputs either the minimum or the maximum count value, whichever is the operable limit for the applicable operation (e.g., in the example of FIG. 3A, the minimum count value is output when write enable signal 317 is active, and the maximum count value is output when write enable signal 317 is inactive). Thus, the present adjustment logic may be further configured to maintain at least one state variable of the write signal (e.g., the power, energy and/or current) during the write and the non-write operations so as not to exceed predefined maximum and minimum values.

Multiplexer/divider 314 generally selects either divider value M or divider value N, depending on the state of write enable signal 317, then divides the periodic signal Clock by the selected divider value to generate counter clock signal 315. When a write operation is active, the divider value corresponding to the predetermined time period for decreasing the applied power/current is selected, and a write counter clock signal is output at node 315 (having a period corresponding to time increments 232a-g and 234a-c in FIG. 3A). When the write operation is inactive, the divider value corresponding to the predetermined time period for increasing the applied power/current is selected, and a non-write counter clock signal is output at node 315 (having a period corresponding to time increments 233a and 235a-i in FIG. 3A).

Figure 5B:
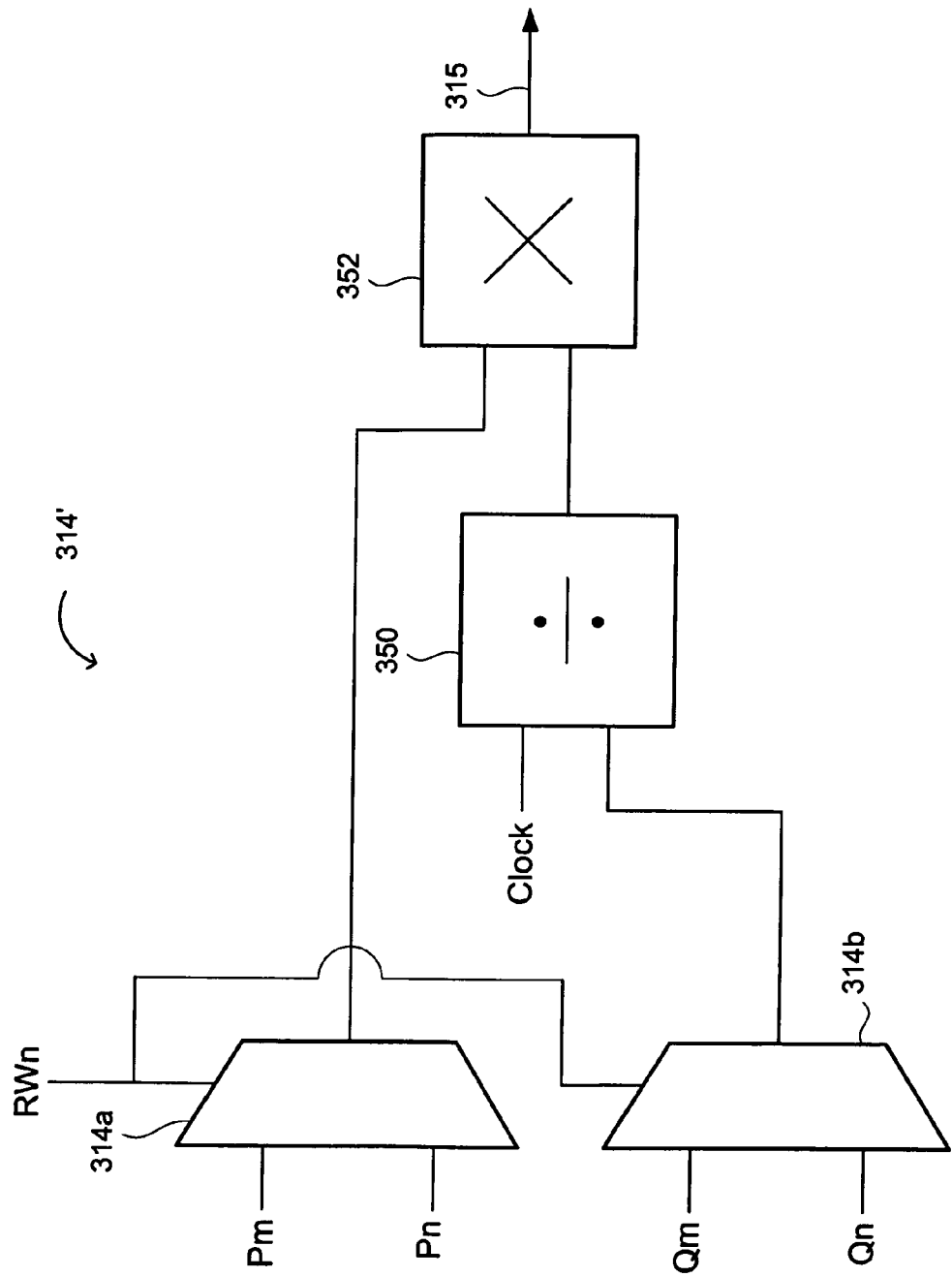
FIG. 5B is a schematic diagram of an implementation of a selection circuit and timing generator suitable for use in the present spacing adjustment circuitry.

FIG. 5B shows an exemplary embodiment of multiplexer/divider 314', comprising first multiplexer 314a, second multiplexer 314b, divider 350 and multiplier 352. First multiplexer 314a receives first and second multiplier values Pm and Pn, and second multiplexer 314b receives first and second divider values Qm and Qn. Generally, multiplier value Pm and divider value Qm correspond to divider value M in FIG. 5A, and multiplier value Pn and divider value Qn correspond to divider value N in FIG. 5A. Referring back to FIG. 5B, when write enable signal RWn has a state enabling an active write operation, one of the multiplier values (e.g., Pm) and one of the divider values (e.g., Qm) are selected and respectively input into multiplier 352 and divider 350. The write counter clock output 315 then has a period equal to that of the reference clock Clock times the ratio Pm/Qm. Similarly, when write enable signal RWn has a state enabling an active write operation, one of the multiplier values (e.g., Pm) and one of the divider values (e.g., Qm) are selected and respectively input into multiplier 352 and divider 350. The write counter clock output 315 then has a period equal to that of the reference clock Clock times the ratio Pm/Qm. Such an embodiment may be useful for providing a wide variety of different time periods for adjusting the applied power/current with a minimal set of data.

Thus, the adjustment logic may comprise (1) a first selection circuit configured to select one of (i) a first unit time or first unit change correlated to a first scaling factor during the write operation or (ii) a second unit time or second unit change correlated to a second scaling factor between write operations or during a non-write operation; and/or (2) a second selection circuit configured to select one of (iii) a minimum value for the state variable during the write operations, or (iv) a maximum value for the state variable during the first and second write operations during non-write operations. The adjustment logic may also comprise (or receive the output of) a first memory (or means for storing data) containing data correlating the decrease in the write signal current with the length of time of the write operation, and a second memory (or means for storing data) containing data correlating the increase in the write signal current with the second length of time (e.g., of the non-write operation). Such memories can comprise one or a plurality of programmable (configuration) bits, as described herein. For example, the first memory may comprise a register containing data relating to or derived from a rate of thermal expansion of the write mechanism, and the second memory may comprise a register containing data relating to or derived from a rate of thermal contraction of the write mechanism. Also, when the write operation comprises a cold write operation, the adjustment logic may comprise a memory (e.g., one or more programmable bits) containing data correlating the first length of time (i.e., in this embodiment, of the cold write operation) to a coercivity of the data storage medium.

Counter logic 320 generally comprises an up/down counter receiving write enable signal 317 as an up/down (U/D) directional signal, a multi-bit minimum/maximum count input 313 (e.g., A:N) and a counter clock signal 315 from adjustment logic 310, and an enable signal. Generally, when the counter counts up, the counter is configured not to exceed the maximum count value, and when the counter counts down, the counter is configured not to go lower than the minimum count value. As explained in part with reference to FIG. 3, counter logic 320 may provide a multi-bit output $Q_1:Q_N$ representative of the amount of power, energy or current that is to be provided to write mechanism 340. N and n may independently be any integer of at least 2, but in certain embodiments, N and n are the same (which number represents the width of, or the number of bits in, the counter), and are an integer of from 3 to 10, 4 to 8, or 5 to 7.

Output logic 330 may comprise a write current (Iw) or oscillator register (or other memory) 332 adapted to store an output of counter logic 320 and a write driver circuit 334. Thus, the present circuit may comprise an output driver configured to provide an output current to the write mechanism. Alternatively, write current/oscillator register 332 may be replaced by (or may further comprise) a digital-to-analog converter (e.g., current digital-to-analog converter or I-DAC, or other such means for converting a [multibit] digital signal to an analog signal), configured to convert an output of the counter to an analog input for the output circuit.

Write driver 334 may comprise a conventional output driver circuit. In one embodiment, write driver 334 may comprise a plurality of output driver circuits in parallel, having the same drive strength or a $2^n$ multiple of the smallest driver in the plurality. In the latter case, it may not be necessary to use an I-DAC or register 332; instead, the write driver 334 can receive the output of counter logic 320 directly. Write mechanism (e.g., write head) 340 is conventional, and may further comprise a heater element configured to maintain the write mechanism 340 at a substantially constant temperature. In this latter embodiment, the heater may receive the difference between the maximum current and the current applied to the write mechanism 340 (or an equivalent current, proportional and/or correlated to such difference, adapted to maintain the write mechanism 340 at a substantially constant temperature).

When multiplexer 314 receives two or more periodic (e.g., clock) signals having different frequencies or periods, the counter logic 320 may receive one of the periodic signals (selected in accordance with the state of write enable signal 317) at input 315. However, when multiplexer/divider 314 is configured as shown in FIGS. 5A-5B, counter logic 320 generally receives a derivative of a periodic signal (e.g., Clock, divided by a predetermined value or multiplied by a predetermined ratio). The circuit may, in some embodiments, further comprise a clock circuit configured to provide at least one of the periodic signals.

Exemplary Systems and Network(s)

A further aspect of the invention concerns a system for writing data to a recording medium, comprising the present circuit and the write mechanism, configured to receive the power or energy from the output circuit. Alternatively, the system may comprise the present circuit and a means for writing the data to the data recording medium, configured to receive the write signal from the means for providing the same. As described herein, the write mechanism may comprise a write transducer, and the data storage medium may comprise a magnetic data storage medium. Thus, the system may further comprise a mechanism for rotating the magnetic data storage medium. However, the invention is applicable to other types of data recording mechanisms and systems, such as optical data writing and/or recording mechanisms, optical data storage media, piezoelectric data writing and/or recording mechanisms, piezoelectric data storage media, etc. Thus, the system may comprise an optical data recording and/or storage system, a piezoelectric data recording and/or storage system, etc.

The system may include or be a part of a network, comprising a plurality of the present systems, and a plurality of storage devices. Generally, each storage device is communicatively coupled to a unique one of the systems. The network may be any kind of known network including storage devices, such as a RAID array, an Ethernet network, or wireless network, but preferably, the network comprises a storage network.

Figure 6B:
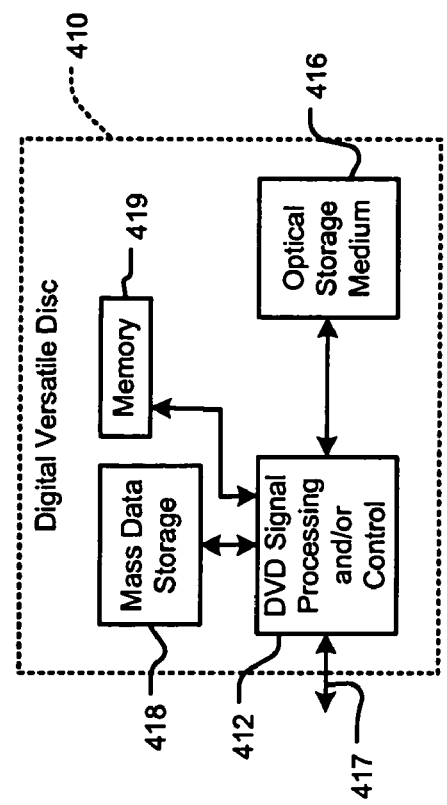
FIGS. 6A-6G are diagrams of various system-level implementations of the present invention.
Figure 6A:
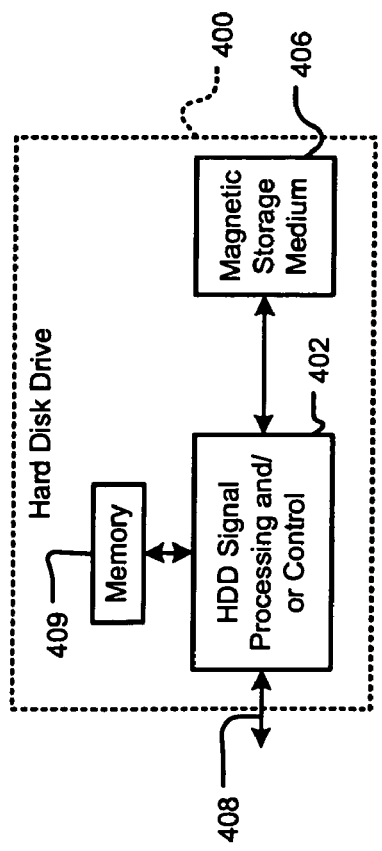

Various exemplary implementations of the present invention are shown in FIGS. 6A-6G. Referring now to FIG. 6A, the present invention can be implemented in a hard disk drive (HDD) 400. The present invention may implement either or both signal processing and/or control circuits, which are generally identified in FIG. 6A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Referring now to FIG. 6B, the present invention can be implemented in a digital versatile disc (DVD) drive 410. The present invention may implement either or both signal processing and/or control circuits, which are generally identified in FIG. 6B at 412, and/or mass data storage of the DVD drive 410. The signal processing and/or control circuit 412 and/or other circuits (not shown) in the DVD 410 may process data, perform coding and/or encryption, perform calculations, and/or format data that is read from and/or data written to an optical storage medium 416. In some implementations, the signal processing and/or control circuit 412 and/or other circuits (not shown) in the DVD 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD 410 may communicate with mass data storage 418 that stores data in a nonvolatile manner. The mass data storage 418 may include a hard disk drive (HDD). The HDD may have the configuration shown in FIG. 6A. The HDD may be a mini HDD that includes one or more platters having a diameter that is smaller than approximately 1.8". The DVD 410 may be connected to memory 419 such as RAM, ROM, low latency nonvolatile memory such as flash memory and/or other suitable electronic data storage.

Figure 6D:
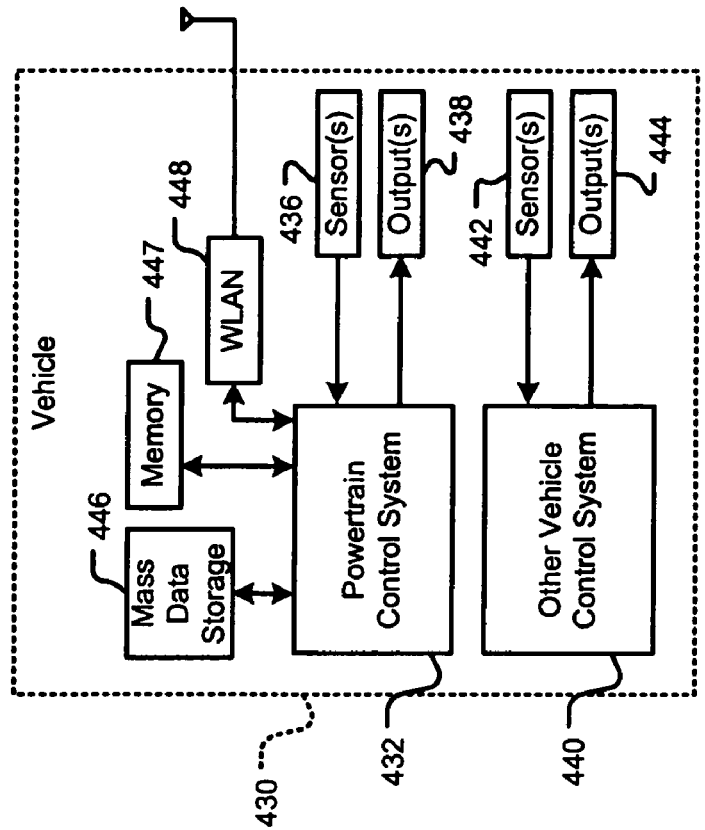
Figure 6C:
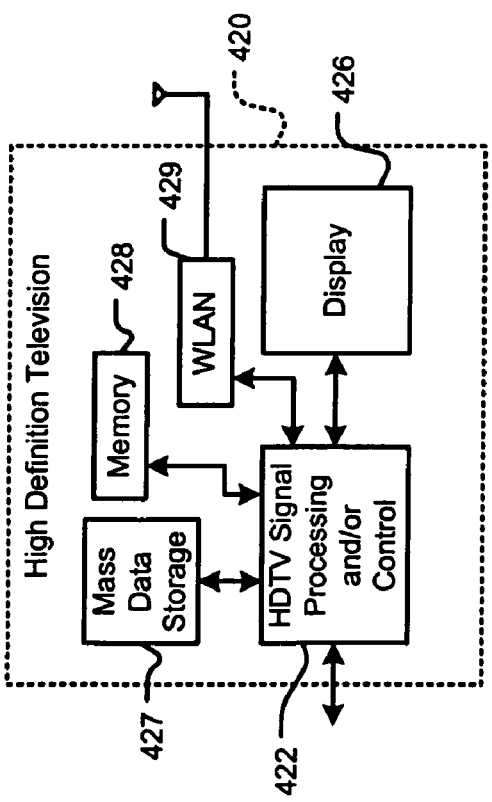

Referring now to FIG. 6C, the present invention can be implemented in a high definition television (HDTV) 420. The present invention may implement either or both signal processing and/or control circuits, which are generally identified in FIG. 6E at 422, a WLAN interface and/or mass data storage of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8"The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 6D, the present invention implements a control system of a vehicle 430, a WLAN interface and/or mass data storage of the vehicle control system. In some implementations, the present invention implement a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices (for example, hard disk drives [HDDs] and/or DVDs). At least one HDD may have the configuration shown in FIG. 6A and/or at least one DVD may have the configuration shown in FIG. 6B. The HDD may be a mini HDD that includes one or more platters having a diameter that is smaller than approximately 1.8"The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 6E:
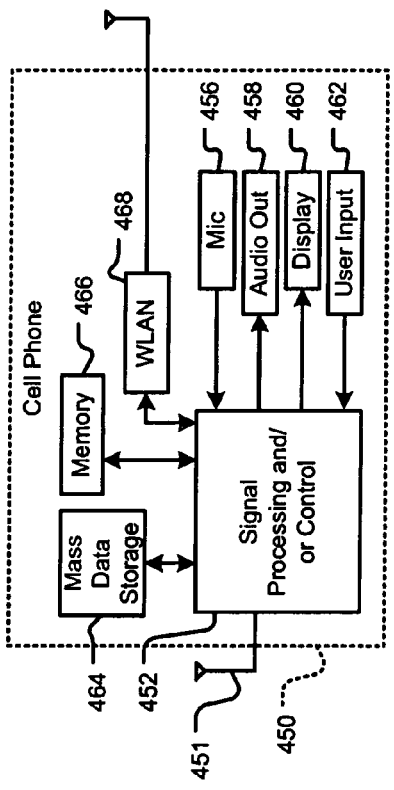

Referring now to FIG. 6E, the present invention can be implemented in a cellular phone 450 that may include a cellular antenna 451. The present invention may implement either or both signal processing and/or control circuits, which are generally identified in FIG. 6E at 452, a WLAN interface and/or mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices (for example, hard disk drives [HDDs] and/or DVDs). At least one HDD may have the configuration shown in FIG. 6A and/or at least one DVD may have the configuration shown in FIG. 6B. The HDD may be a mini HDD that includes one or more platters having a diameter that is smaller than approximately 1.8"The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 6F:
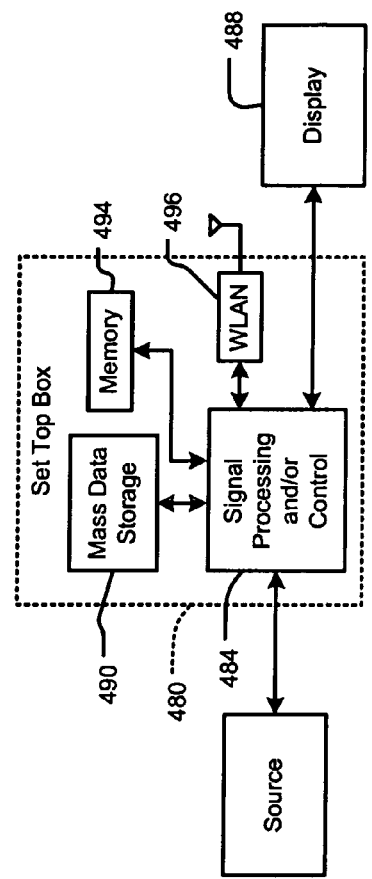
Figure 6G:
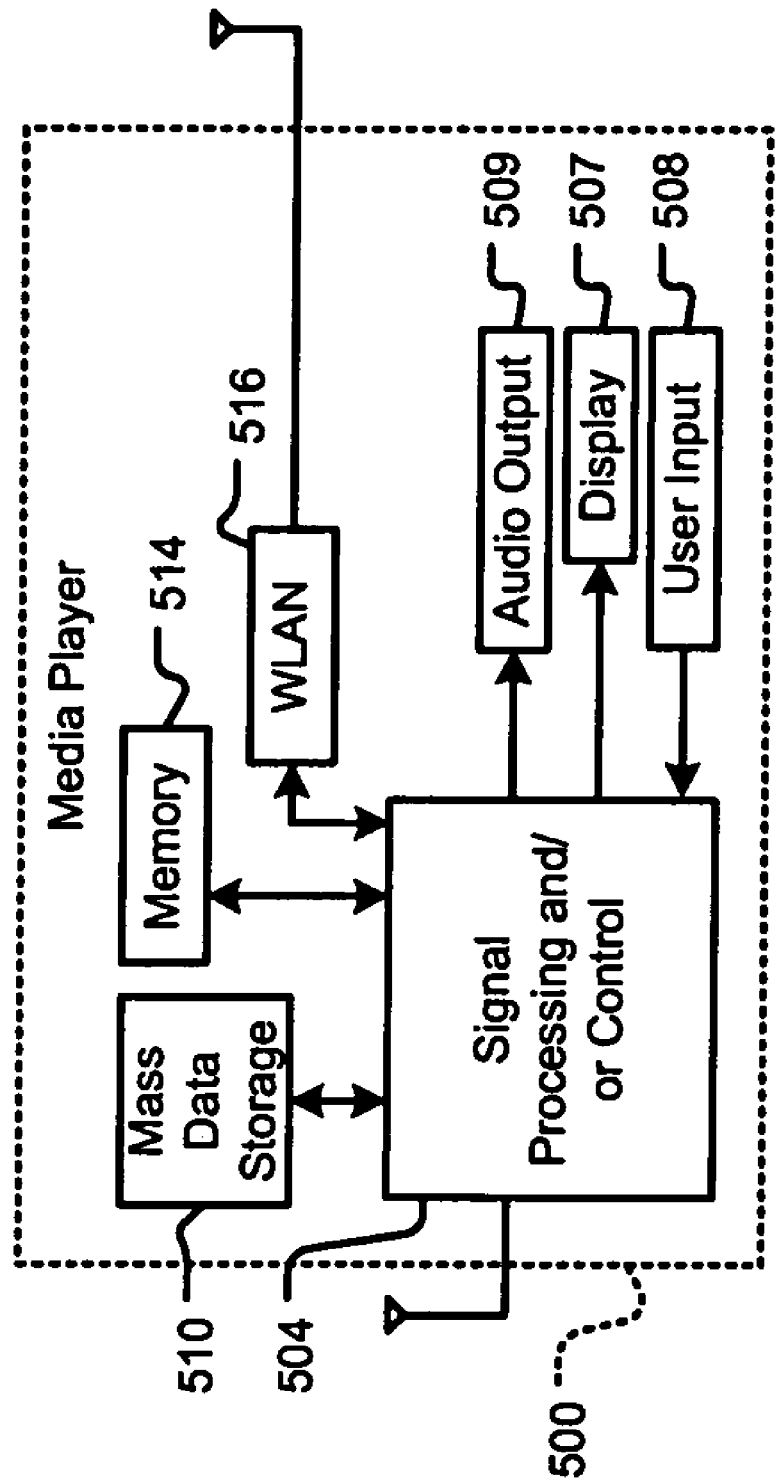

Referring now to FIG. 6F, the present invention can be implemented in a set top box 480. The present invention may implement either or both signal processing and/or control circuits, which are generally identified in FIG. 6F at 484, a WLAN interface and/or mass data storage of the set top box 480. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices (for example, hard disk drives [HDDs] and/or DVDs). At least one HDD may have the configuration shown in FIG. 6A and/or at least one DVD may have the configuration shown in FIG. 6B. The HDD may be a mini HDD that includes one or more platters having a diameter that is smaller than approximately 1.8"The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Referring now to FIG. 6F, the present invention can be implemented in a media player 500. The present invention may implement either or both signal processing and/or control circuits, which are generally identified in FIG. 6G at 504, a WLAN interface and/or mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one HDD may have the configuration shown in FIG. 6A and/or at least one DVD may have the configuration shown in FIG. 6B. The HDD may be a mini HDD that includes one or more platters having a diameter that is smaller than approximately 1.8"The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

CONCLUSION/SUMMARY

Thus, the present invention provides a circuit, architecture, system and method for adjusting spacing between a data writing mechanism and a data storage medium. The method generally comprises the steps of (a) providing a first energy to the data recording mechanism during a write operation, the first energy having a value correlated to a length of time of the write operation; and (b) providing a second energy to the data recording mechanism during a non-write operation, the second energy having a value correlated to a length of time of the non-write operation, the second energy correlation differing from the first energy correlation. The circuit generally comprises (1) a controller configured to independently control an increase and a decrease in energy to a write mechanism adapted to transfer data to a data storage medium, (2) adjustment logic configured to (i) decrease the energy to the write mechanism in accordance with a length of time of a write operation to the data storage medium, and (ii) increase the energy to the write mechanism in accordance with a length of time of a non-write operation, the increase in energy differing from an absolute value of the decrease in energy, and (3) an output circuit configured to provide the energy to the write mechanism.

The present invention advantageously reduces adverse spacing modulation between a data writing mechanism (such as a write transducer or other data recording device having a pole or tip that protrudes from a write mechanism such as a read/write head) and the data storage medium when the data writing mechanism exhibits properties that differ as a function of time, depending on whether energy is applied to the data writing mechanism (e.g., during a write operation) or not (e.g., during operations other than writing). In turn, minimizing such spacing modulation can improve data integrity, reduce bit error rates, and enable "cold write" operations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of adjusting spacing between a data writing mechanism and a data storage medium, the method comprising:
    a) determining a first length of time for a first write operation, the first write operation comprising a cold write operation;
    b) determining a second length of time between said first write operation and a second write operation;
    c) correlating at least one scaling factor for at least one state variable of a write signal provided to said data writing mechanism to a coercivity of the data storage medium; and
    d) adjusting said at least one state variable in accordance with data correlating said at least one scaling factor for said at least one state variable with said first length of time and/or said second length of time.

2. The method of claim 1, wherein the at least one state variable comprises a member selected from the group consisting of a boost current, a boost time, and a write current.

3. The method of claim 1, wherein the adjusting step comprises applying first and second scaling factors to said write signal, the first scaling factor being applied during said first length of time, and the second scaling factor being applied during said second length of time.

4. The method of claim 3, wherein the first and second scaling factors differ from each other.

5. The method of claim 4, wherein the first scaling factor is correlated to a thermal time constant of expansion of said data writing mechanism during said first write operation.

6. The method of claim 5, wherein the second scaling factor is correlated to a thermal time constant of contraction of said data writing mechanism during said second length of time.

7. The method of claim 1, wherein the step of adjusting said write signal comprises decrementing a write current at a first rate during said first length of time.

8. The method of claim 7, wherein decrementing said write current comprises changing a counter every first predetermined period of time during said first write operation, and reducing the write current by a first predetermined current value in response to one or more predetermined counter decrements.

9. The method of claim 1, wherein the step of adjusting said write signal comprises incrementing said write current at a second rate during said second length of time.

10. The method of claim 9, wherein incrementing said applied current comprises changing a counter every second predetermined period of time during said second length of time, and increasing the write current by a second predetermined current value in response to one or more predetermined counter increments.

11. The method of claim 1, wherein the at least one state variable comprises a write signal current that cannot exceed pre-programmed maximum and minimum values.

12. The method of claim 1, comprising adjusting said write signal during an active servo gate operation.

13. A computer-readable medium comprising computer-executable instructions adapted to perform the method of claim 1.

14. A circuit, comprising:
    a) adjustment logic configured to (i) determine a first length of time of a first write operation to a data storage medium, and (ii) determine a second length of time between said first write operation and a second write operation, and comprising a memory containing data correlating the first length of time to a coercivity of the data storage medium;

b) a controller configured to adjust at least one state variable of a write signal provided to a write mechanism adapted to transfer data to said data storage medium in accordance with data correlating an adjustment value for said state variable with said first length of time and/or said second length of time; and c) an output circuit configured to provide said write signal to said write mechanism.

15. The circuit of claim 14, wherein said adjustment logic receives one or more periodic signals.

16. The circuit of claim 15, wherein said controller receives one of said periodic signals or a derivative thereof.

17. The circuit of claim 14, wherein said controller comprises an up-down counter.

18. The circuit of claim 14, wherein said adjustment logic is further configured to maintain the at least one state variable of the write signal so as not to exceed predefined maximum and minimum values.

19. The circuit of claim 14, wherein said adjustment logic comprises a first selection circuit configured to select one of (i) a first unit time or first unit change correlated to a first scaling factor during said first write operation, or (ii) a second unit time or second unit change correlated to a second scaling factor during said second length of time.

20. The circuit of claim 19, wherein said adjustment logic further comprises a second selection circuit configured to select one of (i) a minimum value for said state variable during said first and second write operations, or (ii) a maximum value for said state variable during non-write operations.

21. The circuit of claim 14, wherein the at least one state variable comprises a member selected from the group consisting of a boost current, a boost time, and a write current.

22. The circuit of claim 14, wherein said at least one state variable comprises a write current, and said adjustment logic comprises a first memory containing data correlating a decrease in said write current with the first length of time, and a second memory containing data correlating an increase in said write current with the second length of time.

23. The circuit of claim 14, wherein said data storage medium comprises a magnetic data storage medium.

24. The circuit of claim 14, further comprising a digital-to-analog converter configured to convert an output of said controller to an analog input for said output circuit.

25. The circuit of claim 14, embodied on a single integrated circuit.

26. The circuit of claim 25, further comprising one or more preamplifier circuits.

27. A system for writing data to a data recording or storage medium, comprising:

a) the circuit of claim 14; and b) said write mechanism, configured to receive said write signal from said output circuit.

28. The system of claim 27, wherein said write mechanism comprises a write transducer.

29. The system of claim 28, wherein said data storage medium comprises a magnetic data storage medium.

30. A circuit, comprising:

a) adjustment logic configured to (i) determine a first length of time of a first write operation to a data storage medium, and (ii) determine a second length of time between the first write operation and a second write operation, the adjustment logic comprising a first memory containing data correlating a decrease in a write current of a write signal provided to a write mechanism adapted to transfer data to the data storage medium with the first length of time, and a second memory containing data correlating an increase in the write current with the second length of time;

b) a controller configured to adjust the write current of the write signal provided to the write mechanism in accordance with data correlating the decrease in the write current with the first length of time and the increase in the write current with the second length of time; and c) an output circuit configured to provide the write signal to the write mechanism.

31. The circuit of claim 30, wherein said first memory comprises a first register containing data relating to or derived from a rate of thermal expansion of said write mechanism, and said second memory comprises a second register containing data relating to or derived from a rate of thermal contraction of said write mechanism.

32. The circuit of claim 30, wherein said adjustment logic receives one or more periodic signals.

33. The circuit of claim 32, wherein said controller receives one of said periodic signals or a derivative thereof.

34. The circuit of claim 30, wherein said adjustment logic is further configured to maintain the write current of the write signal so as not to exceed predefined maximum and minimum values.

35. The circuit of claim 30, wherein said adjustment logic comprises a first selection circuit configured to select one of (i) a first unit time or first unit change correlated to a first scaling factor during said first write operation, or (ii) a second unit time or second unit change correlated to a second scaling factor during said second length of time.

36. The circuit of claim 35, wherein said adjustment logic further comprises a second selection circuit configured to select one of (i) a minimum value for said write current during said first and second write operations, or (ii) a maximum value for said write current during non-write operations.

* * * * *